F. N. SKINNER.
DISPLAY RACK.
APPLICATION FILED AUG. 10, 1910.

990,671.

Patented Apr. 25, 1911.

WITNESSES:

INVENTOR
Frank N. Skinner
BY
ATTORNEYS

UNITED STATES PATENT OFFICE.

FRANK NEWELL SKINNER, OF COFFEYVILLE, KANSAS.

DISPLAY-RACK.

990,671. Specification of Letters Patent. Patented Apr. 25, 1911.

Application filed August 10, 1910. Serial No. 576,475.

*To all whom it may concern:*

Be it known that I, FRANK N. SKINNER, a citizen of the United States, and a resident of Coffeyville, in the county of Montgomery and State of Kansas, have invented a new and Improved Display-Rack, of which the following is a full, clear, and exact description.

The invention relates to display racks of the hanging type, and has for an object to provide a rack for displaying articles in stores and the like.

For the purpose mentioned, use is made of a rod for suspension from a support, a clamp mounted to swing on the rod and adapted to support a table, and means for rigidly securing the clamp relative to the rod to hold the table substantially rigid relative to the rod.

Reference is to be had to the accompanying drawings constituting a part of this specification, in which similar characters of reference denote corresponding parts in all the views, and in which—

Figure 1:
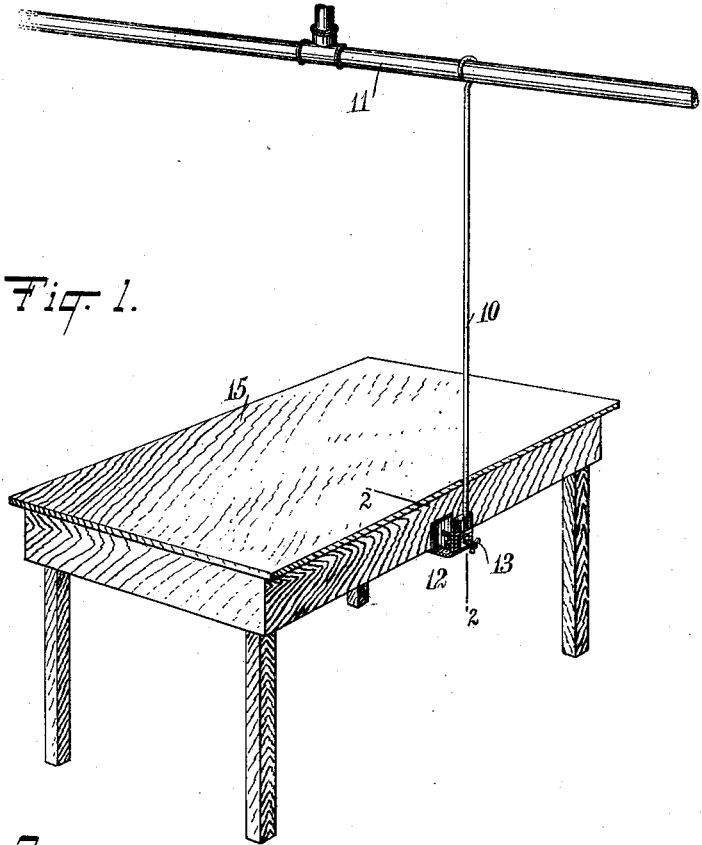
Figure 2:
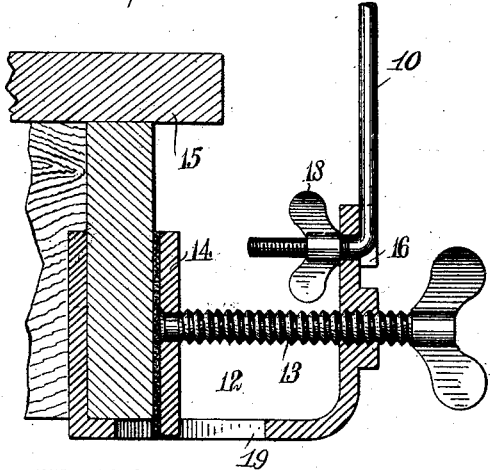
Figure 3:
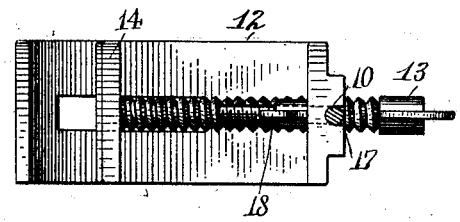

Figure 1 is a perspective view of my invention and showing the same in operative position; Fig. 2 is a fragmentary sectional view taken on the line 2—2 in Fig. 1; and Fig. 3 is a plan view of the clamp of my device.

Referring more particularly to the drawings, a rod 10 is provided, for suspension from a support or hanger 11. The lower end of the rod is preferably screw threaded, and mounted to swing on the rod is a clamp 12, provided with an adjusting screw 13, secured to a screw plate 14, and by means of the said plate and screw a table 15 is rigidly held on the clamp 12. On the clamp 12 are outwardly extending lugs 16 forming a groove 17, and a thumb screw 18 is screw-threadedly mounted on the threaded portion of the rod 10. The slot 19 in the clamp 12 is adapted to receive one end of the screw plate 14, and constitutes a guide for the plate when the screw 13 is operated.

With the table mounted to swing on the rod 10, the said table can be easily tilted or turned, and this feature is especially useful when it is desired to sweep beneath the table or dust the table. To rigidly secure the table relative to the rod 10, the rod is disposed in the groove 17, as shown in Figs. 2 and 3, and the thumb screw 18 is tightened, thus rigidly securing the clamp and table relative to the rod. To release the clamp from rigid engagement with the rod, the thumb screw 18 is released and the rod is moved a distance away from the groove 17, so that the rod will not engage the lugs 16. When this position is assumed the clamp 12 will easily swing on the rod 10, thus also permitting the table 15 to swing.

It will be understood that various sized tables or boards, adapted for displaying articles, can be employed with my device; and it will be further understood that although I have shown a particular construction for the purpose of illustrating my device, the scope of the invention is defined in the appended claims.

Having thus described my invention, I claim as new and desire to secure by Letters Patent:

1. A display rack comprising a rod depending from a support, and a grooved clamp mounted on the rod and adapted to support a table, the said clamp being mounted to swing on the rod when the rod is spaced from the groove and adapted to assume a rigid position relative to the rod when the rod is disposed in the groove.

2. A display rack comprising a rod for suspension from a support, a screw clamp mounted to swing on the rod, a table rigidly secured to the clamp, and lugs on the clamp and constituting a groove to rigidly secure the clamp relative to the rod when the rod is disposed in the groove.

3. A display rack comprising a rod for suspension from a support, a screw clamp mounted to swing on the rod and adapted to support a table, a screw on the clamp for securing the table to the clamp, and a screw at one end of the rod, and adapted to engage the clamp to rigidly secure the clamp to the rod.

In testimony whereof I have signed my name to this specification in the presence of two subscribing witnesses.

FRANK NEWELL SKINNER.

Witnesses:
G. R. GRIGG,
W. H. LAPE.

Copies of this patent may be obtained for five cents each, by addressing the "Commissioner of Patents, Washington, D. C."